United States Patent
Otsubo (12) 
(10) Patent No.: US 6,169,629 B1
(45) Date of Patent: *Jan. 2, 2001

(54) METHOD AND APPARATUS FOR THREE-DIMENSIONAL IMAGE RECORDING/REPRODUCTION

(75) Inventor: Makoto Otsubo, 7-6, Higashinarumi 1-chome, Yahatanishi-ku, Kitakyushu-shi, Fukuoka 806 (JP)

(73) Assignee: Makoto Otsubo, Fukuoka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/973,606
(22) PCT Filed: Jun. 25, 1996
(86) PCT No.: PCT/JP96/01749
  § 371 Date: Apr. 6, 1998
  § 102(e) Date: Apr. 6, 1998
(87) PCT Pub. No.: WO97/01795
  PCT Pub. Date: Jan. 16, 1997

(30) Foreign Application Priority Data

Jun. 26, 1995 (JP) .................................... 7-183428

(51) Int. Cl.⁷ .................................................. G02B 27/22
(52) U.S. Cl. ............................ 359/462; 359/477; 359/613
(58) Field of Search .................................... 359/462, 463, 359/477, 613

(56) References Cited

U.S. PATENT DOCUMENTS 2,313,947 * 3/1943 Klinkum ............................. 359/463
4,621,897 * 11/1986 Bonnet ................................. 359/462
5,349,419 * 9/1994 Taguchi et al. ..................... 359/463
5,680,233 * 10/1997 Faris et al. ............................ 349/61

FOREIGN PATENT DOCUMENTS

| | | |
|---|---|---|
| 0 305 274 B1 | 3/1989 | (EP) . |
| 48-32338 | 10/1973 | (JP) . |
| 64-54437 | 3/1989 | (JP) . |
| 1-158423 | 6/1989 | (JP) . |
| 6-78340 | 3/1994 | (JP) . |
| 6-133340 | 5/1994 | (JP) . |
| 6-160769 | 6/1994 | (JP) . |

* cited by examiner

Primary Examiner—Jon Henry
(74) Attorney, Agent, or Firm—Armstrong, Westerman Hattori, McLeland & Naughton (57) ABSTRACT

A three-dimensional image recording/reproduction method, and an apparatus therefor. An opaque light control panel having a large number of fine light transmission portions at predetermined locations is placed between an object and a recording panel, and a large number of small images of the object are formed on the recording panel through the minute light transmission portions. The small images recorded on an picture display panel are reproduced to display the three-dimensional image of the object. An opaque panel having an opening is disposed around the object or between the object and the light control panel, and a conversion operation is carried out so as to reverse the small image of the opening formed on the recording panel point-symmetrically by 180 degrees with respect to a point, at which a line connecting the center of the opening of the opaque panel to each fine light transmission portion, being the point of symmetry. The cubic image is formed in front of the light control panel.

2 Claims, 6 Drawing Sheets

METHOD AND APPARATUS FOR THREE-DIMENSIONAL IMAGE RECORDING/REPRODUCTION

TECHNICAL FIELD

This invention relates to a method and system for recording and reproducing or regenerating a stereoscopic image which enables an observation of a bright and clear three dimensional image.

BACKGROUND ART

Conventionally, as a method for recording and reproducing a stereoscopic image making use of a multiplicity of minute or fine light transmitting portions such as pinholes, there is a method for recording and reproducing a stereoscopic image as proposed by Lipman. The basic principle of this method for recording and reproducing the stereoscopic image is explained referring to FIG. 6.

Figure 6:
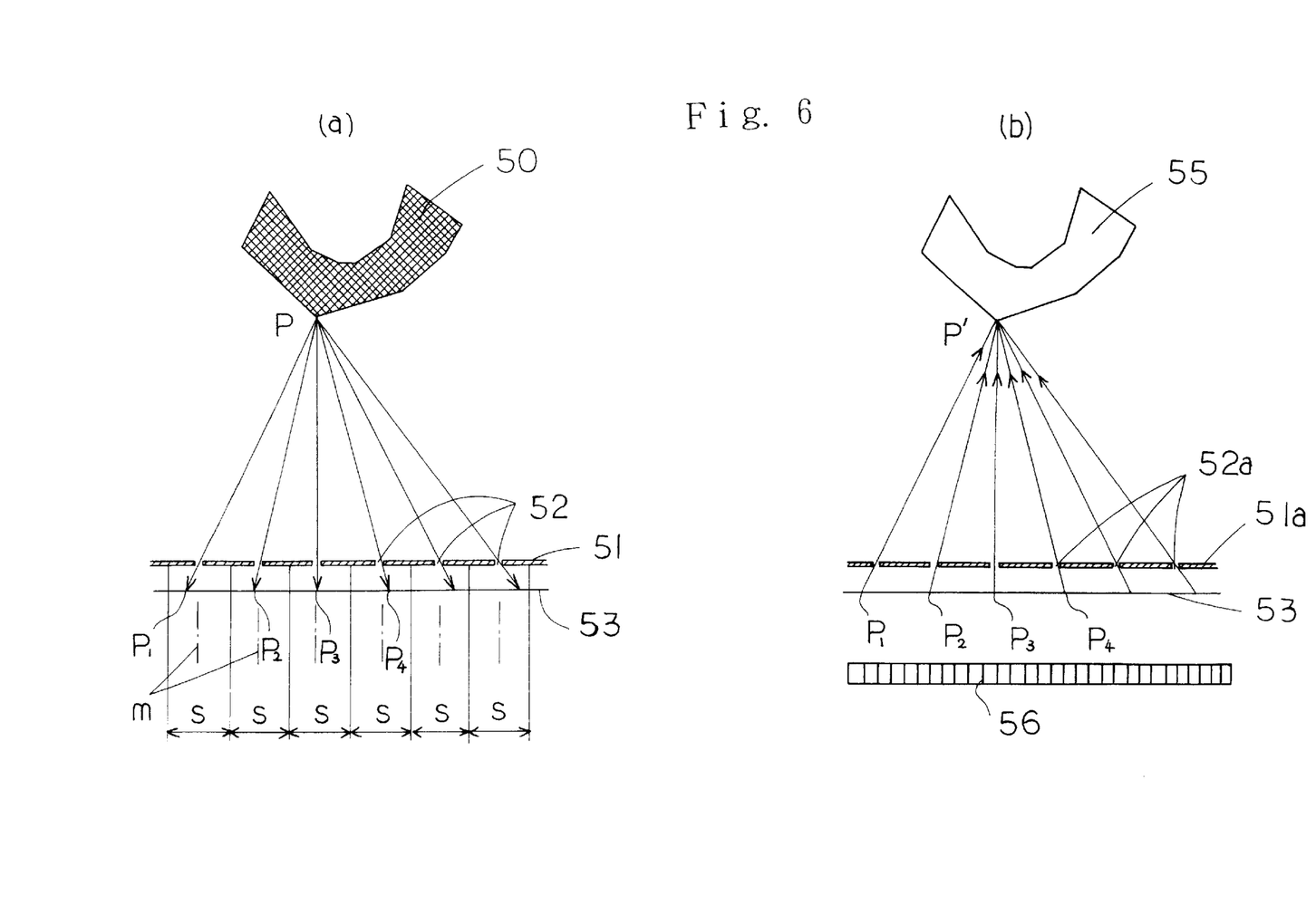
FIG. 6 explanatory view showing a principle of the method for recording and reproducing a stereoscopic image.

As shown in FIG. 6(a), a light control panel 51 being made of an opaque material and having a multiplicity of minute light transmitting portions 52 is disposed in front of a recording panel 53 which is made of photographic dry plate. An image of a object 50 arranged in front of the light control panel 51 is recorded on the recording panel 53 as a multiplicity of small pictures through the respective minute light transmitting portions 52.

In observing such a recorded stereoscopic image, as shown in FIG. 6(b), while the recording panel 53 is illuminated from a back light 56 disposed behind the recording panel 53, a reproduced stereoscopic image 55 can be observed through the light control panel 51a which is disposed in front of the recording panel 53 and has a multiplicity of minute light transmitting portions 52a. Namely, to explain more precisely, in a recording apparatus as shown in FIG. 6(a), an arbitrary point P on the object 50 is recorded as small pictures $P_1$, $P_2$, $P_3$, ... on the recording panel 53 through the respective minute light transmitting portions 52. Then, in a reproducing method as shown in FIG. 6(b), when the light is radiated from the back light 56 onto the respective small pictures formed on the recording panel 53, the light beams generated from these points $P_1$, $P_2$, $P_2$, ... pass through the respective minute light transmitting portions 52a and converge on a point P' so as to reproduce the stereoscopic image 55 on this part.

However, the conventional method for recording and reproducing a stereoscopic image is of a so-called parallel optical axes type, wherein the respective minute light transmitting portions 52 on the light control panel 51 are arranged at positions located in front of a multiplicity of perpendicular lines m which are disposed at the center of a multiplicity of small picture record areas S on the recording panel 53. Therefore, in the above mentioned method, there arise problems that unnecessary scattered light enters the recording areas from things other than the object 50, and the image of the object is chipped or becomes defective partially except for a group of small pictures located near the center of the object.

There is another problem that it is difficult to get a vivid and clear stereoscopic image. Namely, since areas where the respective small pictures are recorded are not defined actually, the neighboring small pictures overlap and interfere with each other.

Furthermore, in the above-mentioned conventional method for reproducing a stereoscopic image, the concaves and convexes of the reproduced stereoscopic image are observed in a reversed mode. In view of the above, it is proposed in the Japanese laid-open patent publication HG6-133340 that respective small pictures on a recording panel are further reversed and such reversed small pictures are recorded on another recording pannel and a stereoscopic image is reproduced from this recording panel in a way as shown in FIG. 6(b). However, this method also has a problem that the stereoscopic image is always formed on the back area of the light control panel 51a, not on the front area of the light control panel 51a.

The present invention has been made in view of the above, and it is an object of the present invention to provide a method and system for recording and reproducing a bright and clear stereoscopic images while forming the same stereoscopic image as that of the original object in front of the light control panel.

DISCLOSURE OF INVENTION

To achieve the above-mentioned object, according to the first invention, there is provided an method for recording and reproducing a stereoscopic image which comprises arranging a first light control panel having a multiplicity of minute light transmitting portions in front of a recording panel, recording an object disposed in front of the first light control panel as a multiplicity of small pictures on the recording panel through the respective minute light transmitting portions, displaying a multiplicity of the recorded small pictures on a picture display panel, and reproducing a stereoscopic image through a second light control panel having a multiplicity of minute light transmitting portions which are disposed in front of the respective small pictures, wherein a shielding panel having an opening portion through which the object can be observed from the first light control panel is disposed between the first light control panel and the object or around the object, and the respective minute light transmitting portions on the first light control panel are formed at positions where neighboring small pictures of the opening portion of the shielding panel can be recorded on the recording panel without overlapping each other, and a transforming operation is carried out such that the respective small pictures of the object including the opening portion whose images are formed on the recording panel are reversed symmetrically by 180 degrees with respect to a point where a straight line which connects a central point of the opening portion of the shielding panel with the respective light transmitting portion of the first light control panel intersects the recording panel, and thereafter the transformed small pictures are displayed on the picture display panel.

In this manner, respective small pictures of the object having the opening portion whose images are formed on the recording panel are transformed or converted by reversing symmetrically by 180 degrees on a plane with respect to a point where a straight line connecting the central point of the opening portion in the shielding panel with the minute light transmitting portion of the first light control panel intersects the recording panel, and thereafter the respective transformed or converted small pictures are displayed on the picture display panel. Therefore, the concaves and convexes of the reproduced stereoscopic image can be displayed in a normal posture. Namely, it is possible to reproduce the same stereoscopic image as observed from the front of the object by reversing the small pictures symmetrically with respect to the central point of the opening portion.

Further, to achieve the above-mentioned object, according to the second invention, there is provided a method for recording and reproducing a stereoscopic image, comprising arranging a first light control panel having a multiplicity of minute light transmitting portions in front of a recording panel made of an opaque material, recording an object disposed in front of the first light control panel as a multiplicity of small pictures on the recording panel through the respective minute light transmitting portions, displaying a multiplicity of the recorded small pictures on a picture display panel, and reproducing a stereoscopic image through a second light control panel having a multiplicity of minute light transmitting portions which are disposed in front of the respective small pictures, wherein a shielding panel having an opening portion through which the object can be observed from the first light control panel is disposed between the first light control panel and the object or around the object, and the respective minute light transmitting portions on the first light control panel are formed at positions where neighboring small pictures of the opening portion of the shielding panel can be recorded on the recording panel without ever overlapping each other, and virtual small pictures imaged on a plane which is formed at the position where a straight line connecting a central point of the opening portion of the shielding panel with the respective minute light transmitting portions of the first light control panel intersects the recording panel and is orthogonal to the straight line are transformed by inverting symmetrically by 180 degrees, and the transformed small pictures are displayed on the picture display panel.

In this way, the image of the object having the opening portion is formed on the recording panel as small pictures and these small pictures are transformed or converted into the point-symmetrical virtual small pictures by reversing them 180 degrees on a plane which is orthogonal to a straight line connecting the central point of the opening portion in the shielding panel with the minute light transmitting portion of the first light control panel and at the position where the straight line intersects the recording panel, and thereafter the virtual small pictures are displayed on the picture display panel so that a stereoscopic image having little distortion on the periphery thereof without changing the pixel density can be reproduced when observed from the front.

The most suitable object to which the method and system for recording and reproducing stereoscopic image in accordance with the present invention is applied is a body which has concaves and convexes in a three-dimensional space and radiates scattered light beams by reflecting light beams radiated from an illumination source. The body may radiate scattered light beams by itself.

Furthermore, minute light transmitting portions formed on the first light control panel are made of minute light transmitting portions which are provided on a panel made of an opaque material. The minute light transmitting portions formed on the light control panel have a function which makes the beam of scattered light radiated from the object selectively pass therethrough so that small pictures of the object are formed on the recording panel. Minute light transmitting portions formed on the second light control panel have a function which makes the beam of scattered light radiated from the respective small pictures on the picture display panel selectively pass therethrough so that a stereoscopic image of the object is formed in front of the light control panel.

The recording panel, for example, is made of a sensitive material such as a photograph film or a photograph paper or a panel on which one or many photo-electric elements such as CCD devices are arranged. Thus, the recording panel defines the means for recording the small pictures of the object formed on the recording panel with optical or electric means.

The picture display panel, for example, is made of a printed paper, a photograph film, a sensitive material such as photograph paper, liquid crystal panels, CRT, plasma display panels or LED panels. Thus, the picture display panel defines means for displaying the recorded small pictures of object with optical or electric means.

The shielding panel is a panel to shield extra light radiated from things other than the object, and is arranged between the first light control panel and the object or around the object. The shielding panel dose not necessarily imply the panel which has a physical opening, but it also includes the panel which has a function of defining the specified space around the object hypothetically or practically.

As for the method and system for recording and reproducing a stereoscopic image in accordance with the present invention, a multiplicity of small pictures of the object are formed and recorded optically or electrically on the photograph film, the sensitive materials such as the photograph paper, the CCD devices or the like through the minute light transmitting portions of the first light control panel. These small pictures are displayed on the picture display panel and are illuminated from behind. Light beams which are radiated from the respective small pictures converge after passing through the minute light transmitting portions so that the stereoscopic image of the object is reproduced in front of the second light control panel.

In the above-mentioned method and the system for recording and reproducing a stereoscopic image, the shielding panel having the opening portion at the center thereof is disposed between the first light control panel and the object or around the object and the minute light transmitting portions are arranged at positions on the light control panel where the small pictures of opening portion can be recorded close to each other while preventing them from overlapping each other on the recording panel. Accordingly, the small pictures which receive a large quantity of light from the object and greatly reduce light radiated from things other than the object can be recorded. Therefore, the scattered light beams radiated from things other than the object can be reduced and the small pictures are recorded so that the bright and clear stereoscopic image without any chipped or defective parts can be reproduced.

Still furthermore, in the method and system for recording and reproducing a steroscopic image, according to the present invention, the minute light transmitting portions of the first and second light control panels may preferably be formed in a slit or a rectangular shape so that a quantity of light passing through the minute light transmitting portions can be increased thereby enabling the recording of bright small pictures and the reproduction of a brighter stereoscopic image.

BEST MODE FOR CARRYING OUT THE INVENTION

Figure 1:
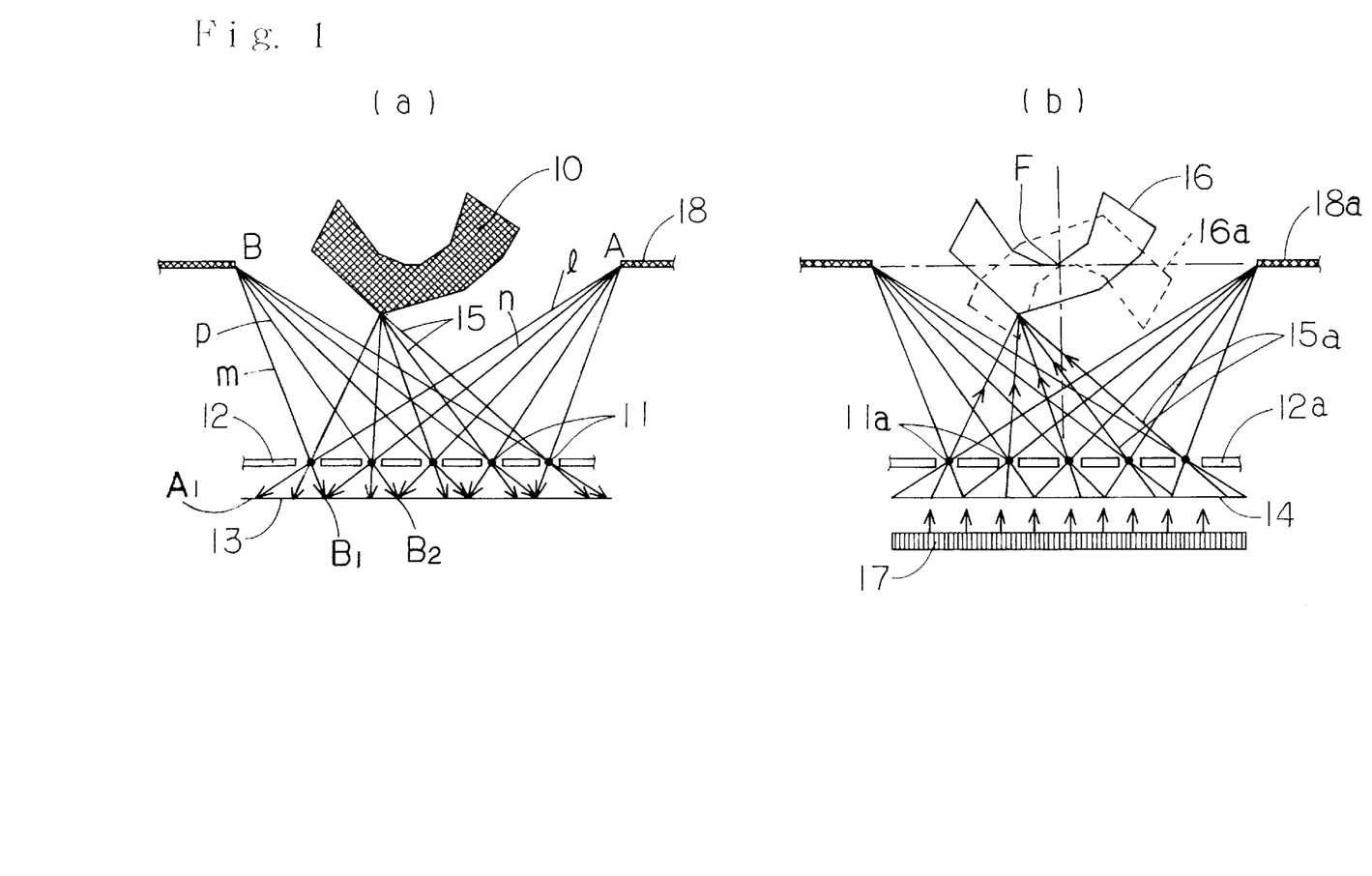
FIG. 1 is an explanatory view showing the method and system for recording and reproducing a stereoscopic image according to the first embodiment of the present invention.

FIG. 1 is an explanatory view showing the method and system for recording and reproducing a stereoscopic image according to the first embodiment of the present invention, wherein FIG. 1 (a) is an explanatory view showing a recording apparatus which can record a multiplicity of small pictures of an object 10 which is disposed at the central position of the opening portion in a shielding panel 18. The recording apparatus comprises a first light control panel 12 having a multiplicity of minute light transmitting portions 11 and a recording panel 13 arranged behind the light control panel 12. These are explained in detail hereinafter.

On the first light control panel 12, ten thousands of minute light transmitting portions 11 are formed with a technique used in the manufacture of integrated circuits such as an etching or a laser working. The number of these minute light transmitting portions may be less or more than the above-mentioned number. Furthermore, the minute light transmitting portions 11 may have mechanical shutters in front of or behind the first light control panel 12. Still furthermore, a liquid crystal panel or the like which can form the minute light transmitting portions 11 electrically on the panel may be employed as the first light control panel 12, wherein the position, the number and the shape of the minute light transmitting portions 11 can be changed as desired by means of an electric operation. The positions where the minute light transmitting portions 11 are formed on the first light control panel 12 are described later.

Although the minute light transmitting portions which have a circular shape in a front view are employed as the minute light transmitting portions 11 in this embodiment, minute light transmitting portions 11 may be in a rectangular shape, for example, wherein a ratio of length between a long side and a short side can be determined to be 10:1 by operating the liquid crystal panel electrically so that the quantity of light passing through the respective minute light transmitting portions 11 in a longitudinal direction can be greatly increased.

As shown in FIG. 1(a), the light beams 15 which are radiated from the object 10 and pass through the minute light transmitting portions 11 form images of the object 10 as a multiplicity of small pictures of the object 10 on the small areas of the recording panel 13 whose positions correspond to the minute light transmitting portions 11 defined on the recording panel 13, and thereafter these small pictures are recorded on the recording panel 13.

The recording panel 13 may be made of a sensitive material such as a photograph film or a photograph paper, or a panel on which one or many photo-electric elements such as CCD devices are arranged. Such a recording panel 13 records the small pictures of the object 10 by optical or electrical means.

FIG. 1(b) is an explanatory view showing a reproducing apparatus which can display the small pictures recorded by the above-mentioned method.

When light beams are radiated on a multiplicity of recorded small pictures of the object 10 by a back light panel 17 after these pictures are displayed on a picture display panel 14, light beams 15a which are radiated from the small pictures displayed on the picture display panel 14 pass through the minute light transmitting portions 11a of the second light control panel 12a and converge so as to form or reproduce a stereoscopic image 16 having reversed concaves and convexes. Furthermore, when a multiplicity of recorded small pictures of the object 10 are reversed by 180 degrees respectively and thereafter are reproduced in the same manner, a stereoscopic image 16a having concaves and convexes in a normal posture can be obtained. In other words, the stereoscopic image 16a is reversed symmetrically with respect to a point F which is a central point of an opening portion of a shielding panel 18a where light axes intersect. Although the shielding panel 18a having the opening portion has been described for an explanation purpose, it is unnecessary in the reproducing apparatus. The picture display panel 14 can employ a panel which displays a multiplicity of small pictures by optical or electrical means. If a multiplicity of small pictures are formed by optical means such as photograph films or the like in the recording apparatus, it is possible to use the recorded photograph film as the picture display panel 14.

Figure 2:
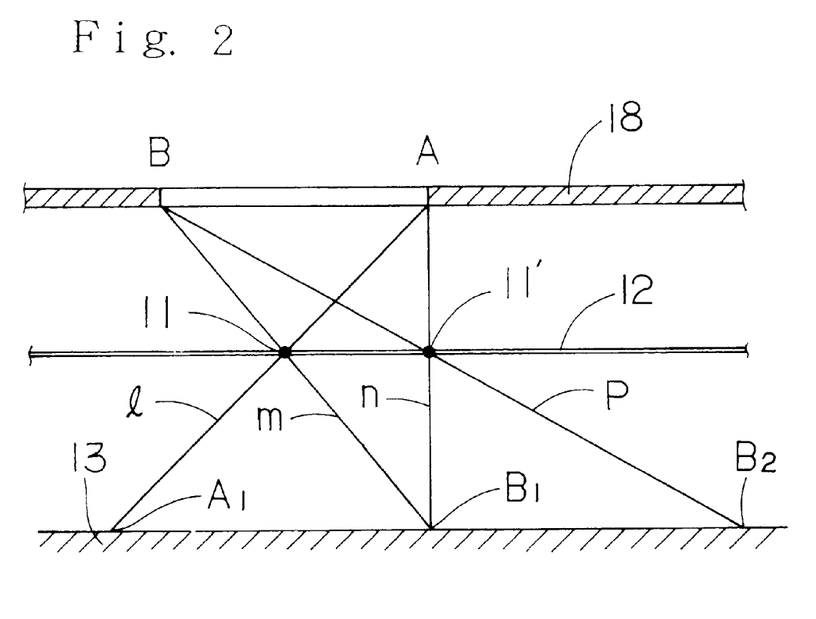
FIG. 2 is an explanatory view showing the manner of arranging each minute light transmitting portion on the light control panel.

The first light control panel 12 of the recording apparatus is described in further detail in view of FIG. 2, wherein the minute light transmitting portions 11 are arranged on the first light control panel 12 such that the small pictures can be recorded close to each other while preventing overlapping of the recorded small pictures.

As shown in FIG. 1 and FIG. 2, a recorded area $A_1-B_1$ where the image of small pictures are formed through the minute light transmitting portions 11 is formed between the positions where straight line 1, m intersect the recording panel 13, wherein the straight lines 1, m respectively connect the minute light transmitting portion 11 arranged on an arbitrary position on the first light control panel 12 with the boundary points A, B in the opening portion of the shielding panel 18.

Subsequently, a minute light transmitting portion 11' which is disposed adjacent to the minute light transmitting portion 11 in a right direction is arranged at the position where a straight line n intersects the first light control panel 12, wherein the straight line n connects the boundary point A with an edge point $B_1$ of the small picture recording area which corresponds to the minute light transmitting portion 11. By determining a point where a straight line p which connects the newly-obtained minute light transmitting portion 11' to the point B intersects the recording panel 13 as a point $B_2$, a small picture recording area $B_1-B_2$ can be obtained.

The above operation is carried out one after another on the surface of the first light control panel 12, so that the positions of the minute light transmitting portions 11 can be determined so as to make the respective adjoining minute light transmitting portions recorded without overlapping each other. This operation can be applied to the determinations of respective positions where the minute light transmitting portions 11a are formed on the second light control panel 12a, as shown in FIG. 1(b) with an auxiliary line.

Figure 3:
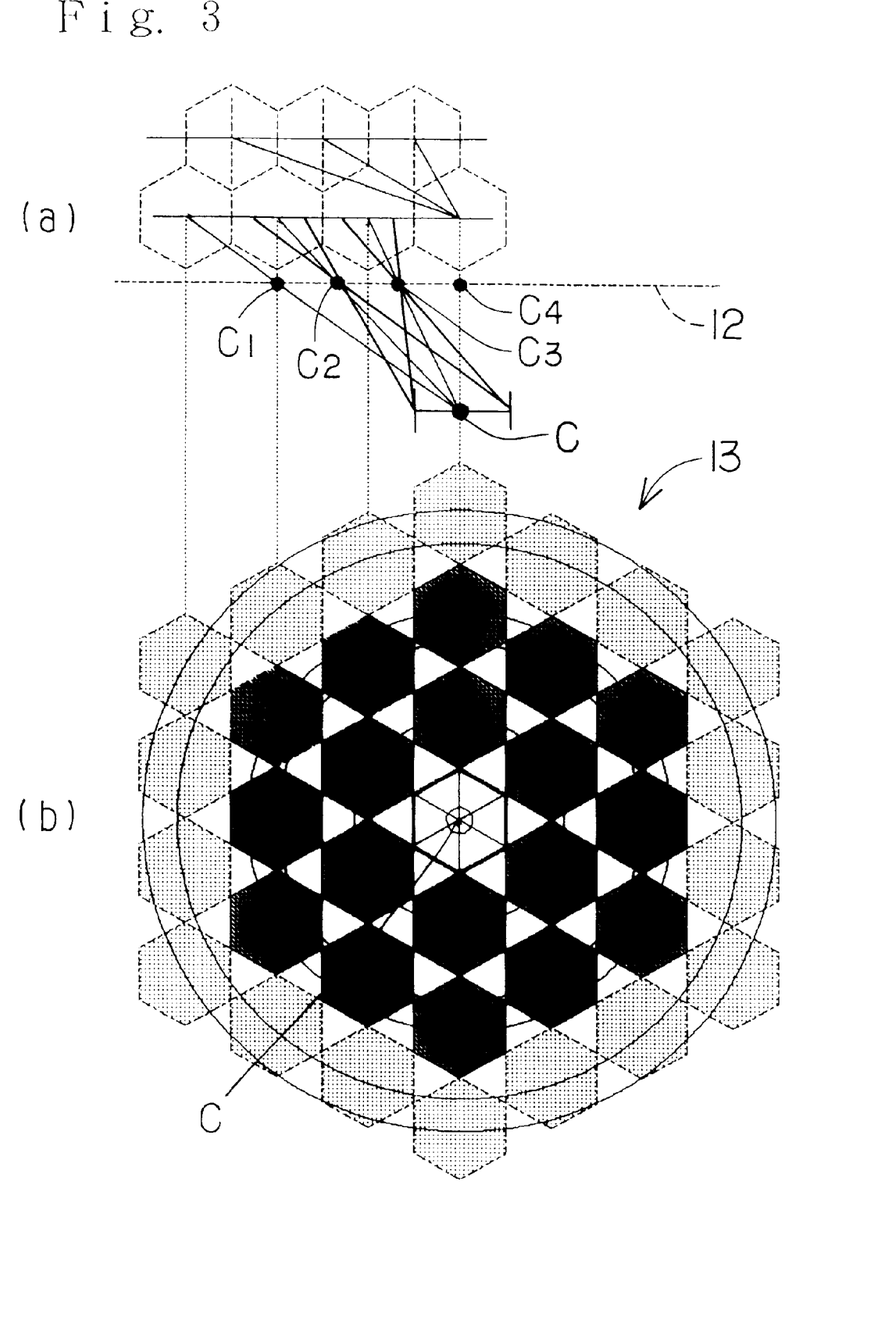
FIG. 3 is a view showing recorded small pictures of the opening portion on the recording panel in a case that the shape of opening portion on the shielding panel is a regular hexagon.

FIG. 3 illustrates an arrangement of the minute light transmitting portion on a condition that the opening portion of the shielding panel is shaped in a regular hexagon, wherein the neighboring small pictures are recorded without overlapping each other on the recording panel. In FIG. 3(a), a point C designates the central point of the opening portion of the regular hexagon, while points $C_1, C_2, C_3, C_4$ designate the minute light transmitting portions arranged in a state of one dimension on the light control panel 12. FIG. 3(b) is a plan view showing respective recorded areas of small pictures on the recording panel 13.

Compared with the conventional method where the shielding panel is not provided and the minute light transmitting portions are not arranged in the above-mentioned manner, the quantity of the light radiated from the object is increased so that the visibility and brightness of the stereoscopic image reproduced by the method shown in FIG. 1(a) and FIG. 1(b) can be improved remarkably.

In this reproducing apparatus, when the stereoscopic image 16 of the object 10 is observed from a position located in front of the shielding panel 18a, the image can be observed as if the object 10 exists in the central part of the opening portion of the shielding panel 18a. Namely, the stereoscopic image 16 of the object 10 is reproduced at the position where the object 10 existed at the time of recording.

In this case, however, the respective small pictures displayed on the picture display panel 14 are reversed symmetrically in shape by 180 degrees with respect to the central points of the small pictures so that the reproduced stereoscopic image including concaves and convexes is reversed upside down as well as left and right when observed from the position located in front of the shielding panel 18.

Figure 4:
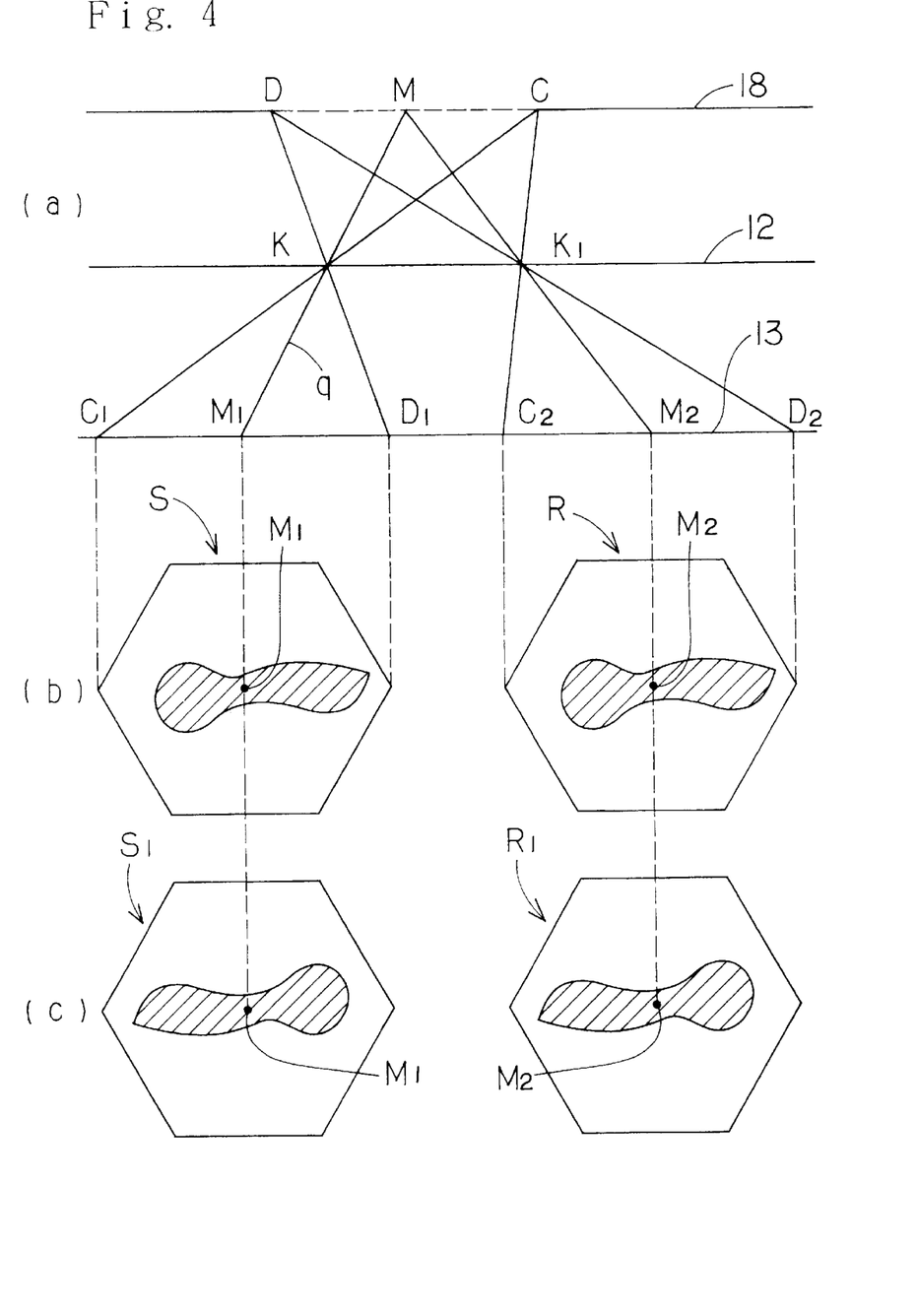
FIG. 4 is an explanatory view showing the method for recording and reproducing a stereoscopic image according to the second embodiment of the present invention.

The method and system for recording and reproducing a stereoscopic image according to the second embodiment which is an improvement of the method and system of the first embodiment are explained while referring to FIG. 4.

FIG. 4(a) is a schematic view showing the light path in the apparatus for recording a stereoscopic image, wherein the apparatus comprises the shielding panel 18, the first light control panel 12 having a multiplicity of minute light transmitting portions and the recording panel 13. In FIG. 4(b), small pictures R and S of the opening portion which are recorded on the recording panel 13 are shown. In FIG. 4(c), the small pictures $R_1$ and $S_1$ which are transformed from the small pictures R and S of the opening portion recorded on the recording panel 13 are shown.

The opening portion D-C having a central point at a point M is formed on the shielding panel 18. Although the geometrical center of gravity of the opening portion is employed as such a central point, it is possible to employ an orthocenter of the opening portion or the like as the central point.

Although a multiplicity of minute light transmitting portions are formed on the first light control panel 12 in practice, only two minute light transmitting portions K and K' are shown in FIG. 4(a) for the convenience of the explanation.

As shown in FIG. 4(b), the inverted small pictures $S(C_1-D_1)$ and $R(C_2-D_2)$ of the opening portion including the object which correspond to the minute light transmitting portions K and $K_1$ respectively are recorded on the recording panel 13. The image of the central point M of the opening portion is recorded respectively at the points $M_1$ and $M_2$ through the minute light transmitting portions K and $K_1$.

Image data of the inverted small pictures S and R of the opening portion are respectively inputted to the computer where an image transforming operation is executed under a mathematical arithmetic processing. Accordingly, as shown in FIG. 4(c), erect small pictures $S_1$ and $R_1$ are obtained by reversing small pictures S and R by 180 degrees symmetrically with respect to the point $M_1$ and $M_2$ on the small pictures respectively, wherein the point $M_1$ and $M_2$ correspond to the central point M of the opening portion.

Therefore, without carrying out any practical operation in geometrical optics, it is possible to carry out the image transforming of respective small pictures by the arithmetic processing on the computer.

Subsequently, the small pictures which are transformed from the image data stored in the computer are displayed on the picture display panel by optical or electrical means. Upon radiation of light from the respective small pictures on the picture display panel, the stereoscopic image of the object can be reproduced at a convergent point of light beams passing through the respective minute light transmitting portions which is located in front of the second light control panel 12a. Since the small pictures displayed on the picture display panel are already reversed by the abovementioned image transforming operation, when the stereoscopic image of the object is reproduced and observed from the front side of the second light control panel 12a, such a stereoscopic image can have the same shape or configuration as that of the object observed from the side of recording panel 13.

Figure 5:
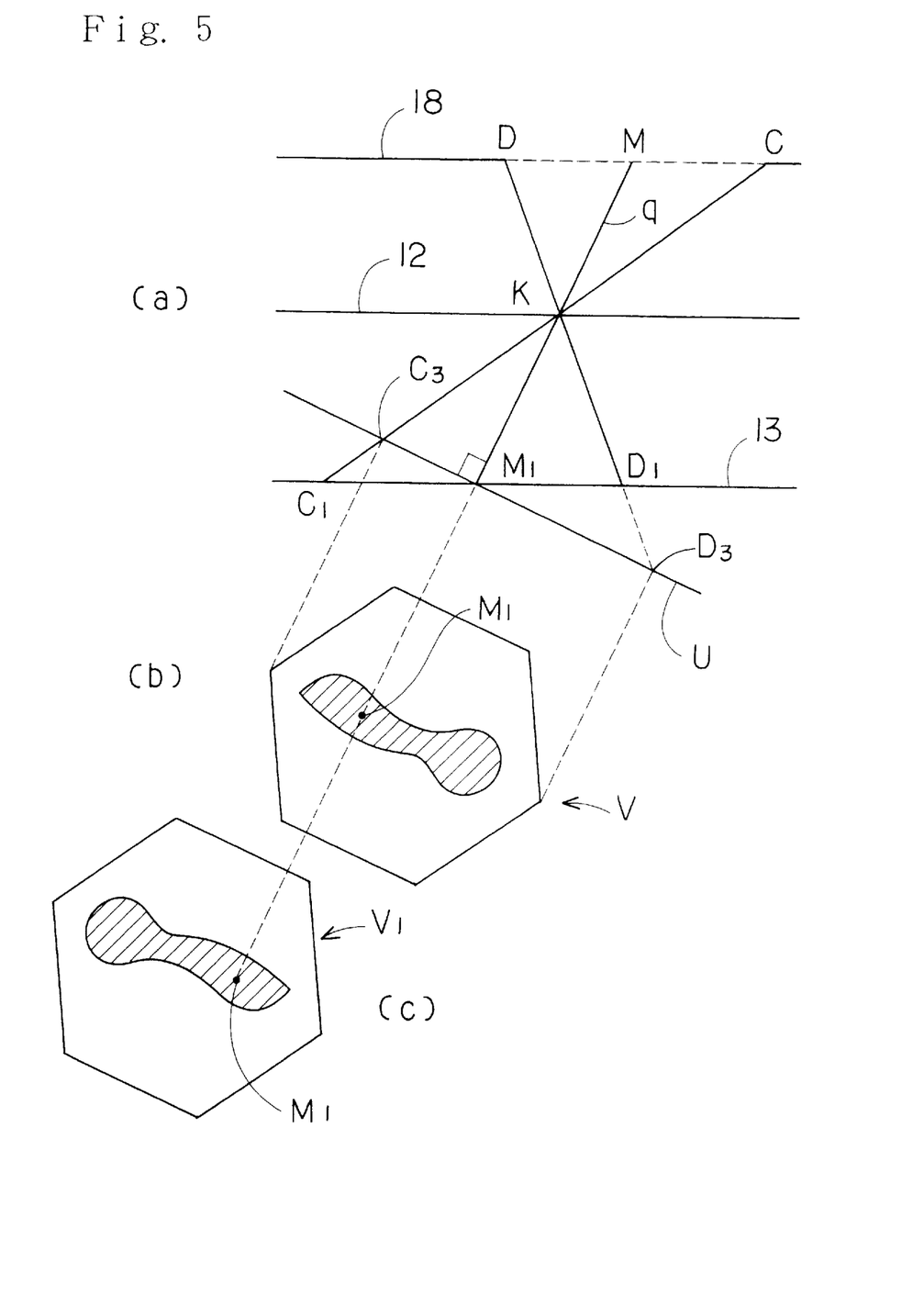
FIG. 5 is an explanatory view showing the method for recording and reproducing a stereoscopic image according to the third embodiment of the present invention.

A method of recording and reproducing stereoscopic image in accordance with the third embodiment which defines a further improvement of the recording and reproducing method of the second embodiment is explained hereinafter referring to FIG. 5. The image transforming operation of small pictures is carried out by processing the image data of small pictures recorded on the recording panel 13 on the computer with the same concept as employed in the first and the second embodiments. Namely, as shown in FIG. 5(a) and 5(b), an image of a small picture $V(C_3-D_3)$ corresponding to a small picture $C_1-D_1$ is formed on a plane U which is orthogonal to the straight line q connecting the central point M of the opening portion on the shielding panel 18 with the minute light transmitting portion K.

Subsequently, a small picture $V(C_3-D_3)$ on the plane U is reversed symmetrically by 180 degree with respect to the point $M_1$ which corresponds to the central point M of the opening portion 18 so that a reversed small picture $V_1$ can be obtained and stored in the computer. It must be noted that the plane U is a conceptional plane which is created in the computer and therefore dose not exist actually. The image data of the small picture $V_1$ is processed arithmetically on the computer so as to be transformed to the small pictures which are displayed on the picture display panel 14 described in the first embodiment of the invention, and then these processed small pictures are displayed on the picture display panel 14.

As described in the second embodiment, when small pictures $R_1$ and $S_1$ which are obtained by reversing the small pictures R and S recorded on the recording panel 13 are displayed on the picture display panel 14, the reproduced stereoscopic image 16a suffers from a distortion when observed from a position in front of the shielding panel 18 which is opposite to an observing direction at the time of recording the object. In this third embodiment, however, it is possible to observe a stereoscopic image having no distortion even when the stereoscopic image is observed in a direction opposite to the observing direction at the time of recording, since the image transforming operation of small pictures is carried out on the plane orthogonal to the light axis which is the straight line q connecting the central point M of the opening portion of the shielding panel 18 with the minute light transmitting portion K.

Although the invention has been described heretofore in view of the embodiments thereof, this invention is not limited to these embodiments, and includes all the modifications within the range not departing from the scope of the invention.

For example, in the above embodiments, although each stereoscopic image is reproduced from the scattered light beams which are radiated from the respective small pictures on the picture display panel illuminated by the back light panel, it may be possible to obtain the scattered light beams from the respective small pictures using the electronic means such as light emitting elements or the like.

It may be possible to use micro lenses or the like to form minute light transmitting portions, while the small pictures displayed on the picture display panel may be artificially created using a technique such as computer graphics or the like.

Still furthermore, in recording a multiplicity of small pictures of the object, it may be possible to employ a method where a camera tool such as a CCD camera is moved little by little on an arbitrary plane so as to photograph the small pictures of the object. In this case, it is possible to record the respective small pictures by assigning a region which corresponds to the opening portion of the shielding panel without employing a physical shielding panel actually.

Industrial Applicability

In the method and system for recording and reproducing a stereoscopic image in accordance with the invention, since the shielding panel having the opening portion at the central area is arranged between the first light control panel and the object or around the object and the minute light transmitting portions formed on the first light control panel are arranged at positions where the image of respective small pictures of opening portion of the shielding panel are formed and recorded on the recording panel without overlapping each other, it is possible to record the small pictures which can receive a large amount of light from the object and a least amount of light from things other than the object. Accordingly, each small pictures has a slight amount of images of things other than image of the object and has no chipped or defective portion so that the bright and clear stereoscopic image can be reproduced.

Furthermore, when the respective small pictures whose images are formed on the recording panel are reversed symmetrically by 180 degrees with respect to the reference point which is the central point of the opening portion of the shielding panel and the reversed small pictures are displayed on the picture display panel, a stereoscopic image of the object which is normal in view of an upside down posture, a left and right posture and concaves and convexes, when observed from the front side of the second light control panel can be reproduced. Therefore, when observing the stereoscopic image of the object from the position in front of the shielding panel which is in a direction opposite to the recording direction, it is possible to observe the stereoscopic image of the object which has the same shape or configuration as seen from the recording panel side.

Especially, when the respective small pictures are reversed on the plane which is orthogonal to the straight line connecting the central point of the opening portion with the minute light transmitting portion, and thereafter these reversed small pictures are displayed on the picture display panel, it is possible to reproduce the stereoscopic image having little distortion in shape without changing the density of pixels.

Still furthermore, when the minute light transmitting portions are formed in a slit-like shape or a rectangular shape in recording and reproducing, a quantity of light which passes through the respective minute light transmitting portions can be increased so that bright small pictures can be obtained in recording, while a bright stereoscopic image can be reproduced when a quantity of the light which passes through the respective minute light transmitting portions on the second light control panel is increased.

I claim:

1. A method for recording and reproducing a stereoscopic image comprising the step of:

arranging a first light control panel having a multiplicity of minute light transmitting portions in front of a recording panel;

recording an object disposed in front of the first light control panel as a multiplicity of small pictures on the recording panel through the respective minute light transmitting portions;

displaying a multiplicity of the recorded small pictures on a picture display panel; and reproducing a stereoscopic image through a second light control panel having a multiplicity of minute light transmitting portions which are disposed in front of the respective small pictures, wherein a shielding panel having an opening portion through which the object can be observed from the first light control panel is disposed between the first light control panel and the object or around the object, and the respective minute light transmitting portions on the first light control panel are formed at positions where neighboring small pictures of the opening portion of the shielding panel can be recorded on the recording panel without overlapping each other, and a transforming operation is carried out such that the respective small pictures of the object including the opening portion whose images are formed on the recording panel are reversed symmetrically by 180 degrees with respect to a point where a straight line which connects a central point of the opening portion of the shielding panel with the respective light transmitting portion of the first light control panel intersects the recording panel, and thereafter the transformed small pictures are displayed on the picture display panel.

2. A method for recording and reproducing a stereoscopic image comprising the steps of:

arranging a first light control panel having a multiplicity of minute light transmitting portions in front of a recording panel;

recording an object disposed in front of the first light control panel as a multiplicity of small pictures on the recording panel through the respective minute light transmitting portions;

displaying a multiplicity of the recorded small pictures on a picture display panel; and using virtual images of said small pictures, reproducing a stereoscopic image through a second light control panel having a multiplicity of minute light transmitting portions which are disposed in front of the respective small pictures, wherein a shielding panel having an opening portion through which the object can be observed from the first light control panel is disposed between the first light control panel and the object or around the object, and the respective minute light transmitting portions on the first light control panel are formed at positions where neighboring small pictures of the opening portion of the shielding panel can be recorded on the recording panel without overlapping each other, and said virtual images of said small pictures that are imaged on a plane, which is formed at the position where a straight line connecting a central point of the opening portion of the shielding panel with the respective minute light transmitting portions of the first light control panel intersects the recording panel and orthogonal to the straight line, are transformed by inverting symmetrically by 180 degrees, and the transformed small pictures are displayed on the picture display panel.

* * * * *